(12) United States Patent
Dolansky

(10) Patent No.: US 7,058,460 B2
(45) Date of Patent: Jun. 6, 2006

(54) REAL-TIME CONTROL PROCESS FOR A CONTROLLER OF AN INDUSTRIAL TECHNICAL PROCESS, AND A REAL-TIME OPERATING PROCESS FOR A COMPUTING DEVICE

(75) Inventor: Stefan Dolansky, Altdorf (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/933,130

(22) Filed: Sep. 2, 2004

(65) Prior Publication Data

US 2005/0055107 A1    Mar. 10, 2005

(30) Foreign Application Priority Data

Sep. 2, 2003   (DE) ............................... 103 40 403

(51) Int. Cl.
   *G05B 11/01* (2006.01)
(52) U.S. Cl. ............................ 700/19; 700/21; 700/65; 700/82; 700/169; 700/306; 714/10; 714/47; 709/201; 709/208; 702/188; 340/3.1
(58) Field of Classification Search .................. 700/9, 700/19–21, 65, 79, 82, 83, 95, 96, 169, 180–182, 700/306; 702/188; 709/201, 208, 217–219, 709/230; 710/110; 340/3.1; 713/100, 1–5, 713/10, 11; 714/100, 7, 1–5, 10, 13, 47
   See application file for complete search history.

(56) References Cited

U.S. PATENT DOCUMENTS

| | | | |
|---|---|---|---|
| 5,530,643 A | 6/1996 | Hodorowski | |
| 5,796,936 A | 8/1998 | Watabe et al. | |
| 6,175,872 B1 * | 1/2001 | Neumann et al. | 709/231 |
| 6,325,198 B1 * | 12/2001 | Pattantyus-Abraham et al. | 198/339.1 |
| 6,553,336 B1 * | 4/2003 | Johnson et al. | 702/188 |
| 2005/0004736 A1 * | 1/2005 | Belcher et al. | |

FOREIGN PATENT DOCUMENTS

| | | |
|---|---|---|
| DE | 35 34 465 A | 4/1987 |
| DE | 199 06 695 A | 8/2000 |

OTHER PUBLICATIONS

Zastrow Wellenreuther: "Automatisieren mit SPS Theorie und Praxis"—Aug. 2001 Vieweg, Germany XP 002309008, pp. 1-29.

(Continued)

*Primary Examiner*—Anthony Knight
*Assistant Examiner*—Crystal J Barnes
(74) *Attorney, Agent, or Firm*—Henry M. Feiereisen

(57) ABSTRACT

Measuring units measure state signals of an industrial technical process. The entirety of the state signals represents an image of the process. The measuring units transmit the state signals to a common logic unit which transmits the image of the process at least partially via a transmission medium to a computing device. The computing device executes a control program to determine at least a portion of the control state for the process and transmits the portion to the logic unit via the transmission medium. The control state includes control signals for a number of control devices. The logic unit transmits to each of the control devices the control signals intended for the respective control device. The control devices affect the process accordingly. The above steps are repeatedly executed in real-time with a cycle time in a range of milliseconds or less.

27 Claims, 4 Drawing Sheets

OTHER PUBLICATIONS

M. Petig: "Netzwerkvariablen—der Weg zur verteilten SPS" in: Elektrotechnische Zeitschrift—ETZ, VDE Verlag GmbH, Berlin, Germany, vol. 121, No. 15, 2000, pp. 6-9, XP001104335 ISSN: 0948-7387, p. 6, col. 3, line 1-p. 7, col. 1, line 20, p. 7, col. 1, line 55-p. 9, col. 1, line 40.

T. Kouthon et al.: Distributing PLC Control, in: Industrial Electronics Control and Instrumentation, 1995, in: Proceedings of the 1995 IEEE IECON 21st International Conference in Orlando, Florida, USA on Nov. 6-10, 1995 and New York, NY, USA, IEEE US Nov. 6, 1995, pp. 1614-1619, XP010154964 ISBN: 0-7803-3026-9, p. 1614, col. 1, line 1-p. 1616, col. 1, line 36.

European Search Report for EP 04 01 9104 dated Dec. 3, 2004.

European Search Report for EP 04 01 9104 dated Mar. 24, 2005.

* cited by examiner

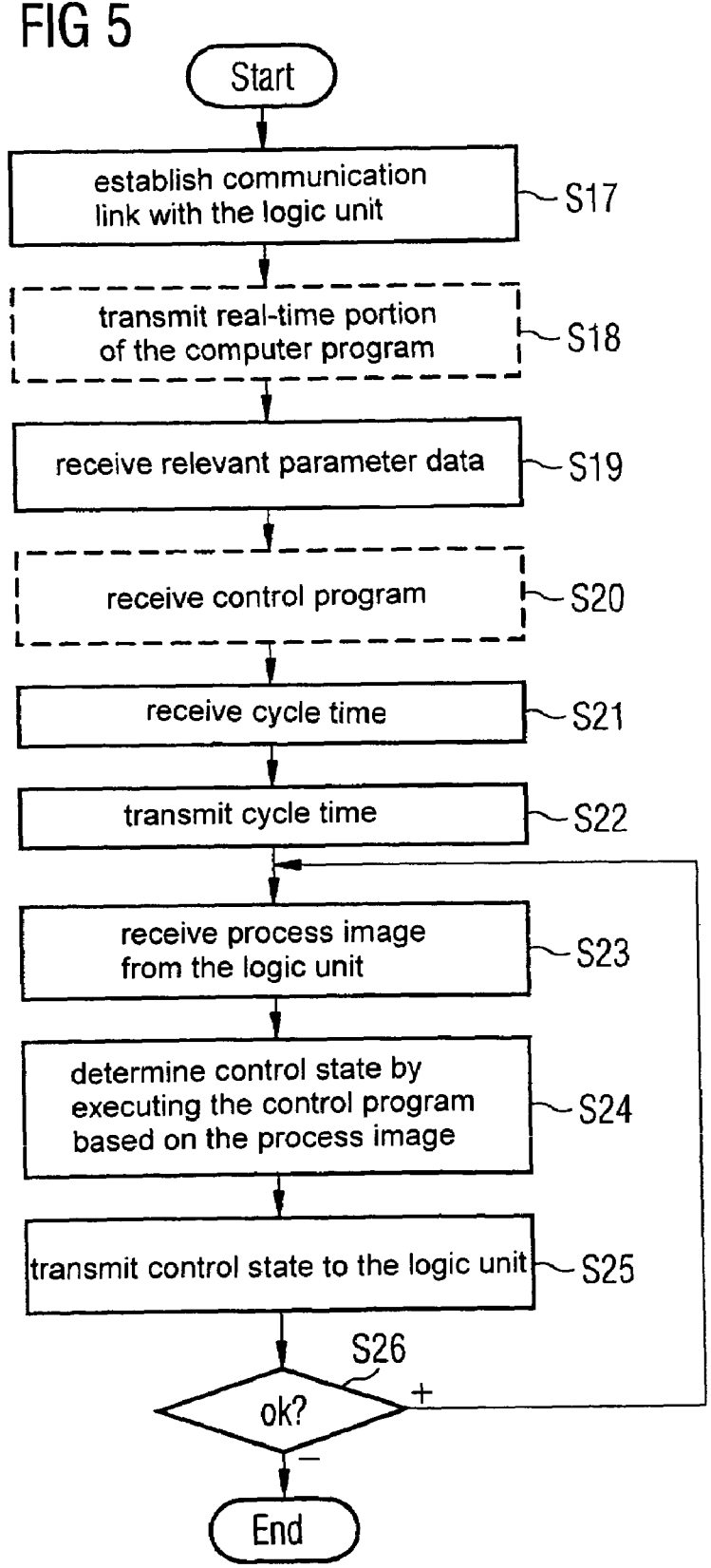

REAL-TIME CONTROL PROCESS FOR A CONTROLLER OF AN INDUSTRIAL TECHNICAL PROCESS, AND A REAL-TIME OPERATING PROCESS FOR A COMPUTING DEVICE

CROSS-REFERENCES TO RELATED APPLICATIONS

This application claims the priority of German Patent Application, Serial No. 103 40 403.1, filed Sep. 2, 2003, pursuant to 35 U.S.C. 119(a)–(d), the disclosure of which is incorporated herein by reference.

BACKGROUND OF THE INVENTION

The present invention relates to a real-time control process for a controller of an industrial technical process, and to a real-time operating process for a computing device.

Nothing in the following discussion of the state of the art is to be construed as an admission of prior art.

Controllers for industrial technical processes are known in the art. Depending on the particular application, these controllers can be implemented as numerical controllers (CNC) or as stored-program controllers (SPS). These controllers operate with a cycle time in the millisecond range or below, and typically execute the following steps:

- A number of measuring units measures state signals of the process, whereby the totality of the measured state signals represents an image of the process.
- Each of the measuring units transmits the state signals measured by that measuring unit to a single logical unit.
- The logic unit executes a control program and determines based on the image of the process a control state for the process, which includes control signals for a number of controllers.
- The logic unit transmits to each of the controllers the control signals intended for the respective controller.
- Each of the controllers effects of the process according to the control signals transmitted true the corresponding controller.

The hardware of conventional devices to execute the control program is located in close proximity to the process. Accordingly, the logic unit must be able to always realize on-site the full functionality of the real-time application. If a greater functionality is required, then it becomes often necessary to replace the logic unit. It can also be a complex process to distribute a new version of control software, in particular the real-time core, to all installed controllers.

It would therefore be desirable and advantageous to provide an improved real-time control process for a controller of an industrial technical process, and an improved real-time operating process for a computing device, which obviate prior art shortcomings and can be operated from a remote location.

SUMMARY OF THE INVENTION

According to one aspect of the present invention, a real-time control process for a controller of an industrial technical process includes the following steps: a plurality of measuring units measures state signals of the process, wherein the measured state signals represent a complete image of the process. Each of the measuring units transmits the measured state signal measured by the measuring unit to a single logical device, which then transmits at least a portion of the complete image of the process via a transmission medium to a computing device. The logic unit receives via the transmission medium from the computing device at least a portion of a control state for the process, wherein the control state includes control signals for a plurality of control devices. The logic unit transmits to each of the control devices the control signals intended for the respective control devices, wherein each of the control devices affects the process in accordance with the control signals transmitted to the corresponding controller.

According to another aspect of the invention, a real-time operating process for a computing device includes the following steps: the computing device receives from a single logical unit via a transmission medium at least one portion of an image of an industrial technical process, and the computing device executes a control program and determines based on the at least one transmitted portion of the image of the process at least one portion of a control state of the process. The computing device transmits the determined portion of the control state via the transmission medium to the logic unit.

Accordingly, the industrial technical process, the measuring units and controllers and the logic unit can be separate from the computing device, which makes it possible to update and/or improve the computing device and/or the real-time core without having to replace the logic unit on-site, because the measured state signals and the control signals that are transmitted to the process remain completely unchanged, and the computing power for determining the control signals need no longer be provided on-site. Moreover, a real-time core that operates the computing device also needs no longer be distributed.

The transmission medium can be implemented in any desired manner, both with respect to its logical construct and also with respect to the physical implementation.

According to one advantageous embodiment, the afore-described steps can be repeatedly executed with total cycle time of less than approximately 20 ms, preferably less than approximately 1 ms, and most preferably of less than approximately 100 µs for a single cycle.

Advantageously, the transmission medium can include a computer network, the Internet or a local area network (LAN), or a combination thereof. A LAN can be implemented, for example, as an Industrial Real-Time Ethernet (IRTE). The transmission medium can also be a point-to-point connection, for example a conventional telephone network. A mixed installation is also possible, for example by establishing a dial-up connection to a computer that is connected to the Internet via the telephone network.

According to yet another advantageous embodiment, the transmission medium can include at least one transmission medium segment with a wireless link and/or with a wired link.

Advantageously, the logic unit can check during each cycle if the computing device has transmitted to the logic unit the control state or the portion of the control state and determine emergency output signals, if the computing device has not transmitted the control state or the portion of the control state to the logic unit, and transmit the emergency output signals to the plurality of control devices. This causes the controlled industrial technical process to operate in a predictable manner even if the communication link between the logic unit and the computing device malfunctions or is interrupted, or if the computing device—for other reasons—does not timely or not at all transmit the control state or portions thereof to the logic unit.

The industrial technical process can be implemented in any form, for example as a production process, in particular a machining process of a machine tool.

According to another advantageous embodiment, a particularly flexible programming of the logic unit can be achieved if before executing the process, the logic unit receives a real-time portion of a computer program to be executed by the logic unit.

Advantageously, the control state can be better determined by the computing device if before executing the process, the logic unit transmits parameter data of the process to the computing device.

According to yet another advantageous embodiment, the cooperation between the logic unit and computing device can be made more flexible if before executing the process, the logic unit transmits via the transmission medium to the computing device a control program to be executed by the computing device. Alternatively, the control program can also be stored in advance in the computing device. Alternatively, the logic unit can also access a control program stored in the computing device.

The cycle time can have a fixed value. Alternatively, before executing the process, the logic unit can transmit to or receive from the computing device the cycle time via the transmission medium.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 5 shows a process flow for a logic unit.

DETAILED DESCRIPTION OF PREFERRED EMBODIMENTS

Figure 1:
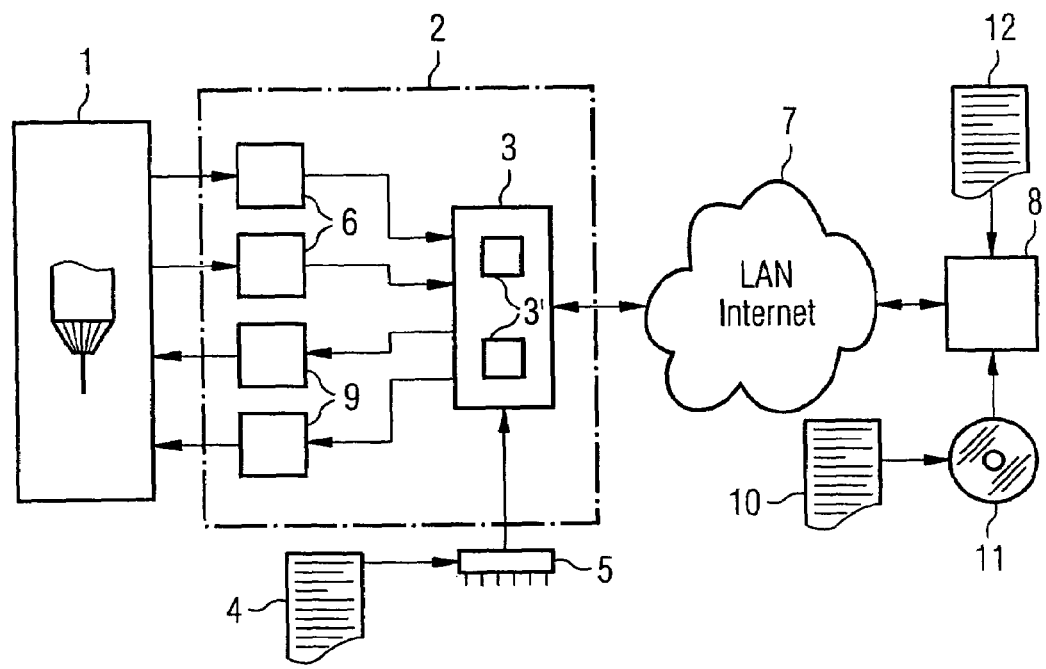
FIG. 1 is a diagram of one embodiment of a controller.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an industrial technical process 1 that is controlled by a controller 2. The industrial technical process 1 in the depicted exemplary embodiment is a production process 1, such as a machining process 1 of a machine tool, as indicated in FIG. 1 by the schematic illustration of a drill chuck and a drill. Accordingly, a logic unit 3 of the controller 2 can then be implemented as a numerical controller 3 (CNC 3). Alternatively, the logic unit 3 can also be implemented as a real-time-capable industrial PC, for example an industrial PC with a numeric real-time kernel (NRK). The logic unit can be implemented as a single unit or alternatively, as depicted in FIG. 1, as several separate physical logic units 3'.

The logic unit 3 is programmed with a computer program 4 that is stored on a data carrier 5, for example a buffered SRAM, in (exclusively) machine-readable form. Based on the computer program 4, the controller 2 executes a real-time control process which will be described hereinafter with reference to FIGS. 1 and 2.

Figure 2:
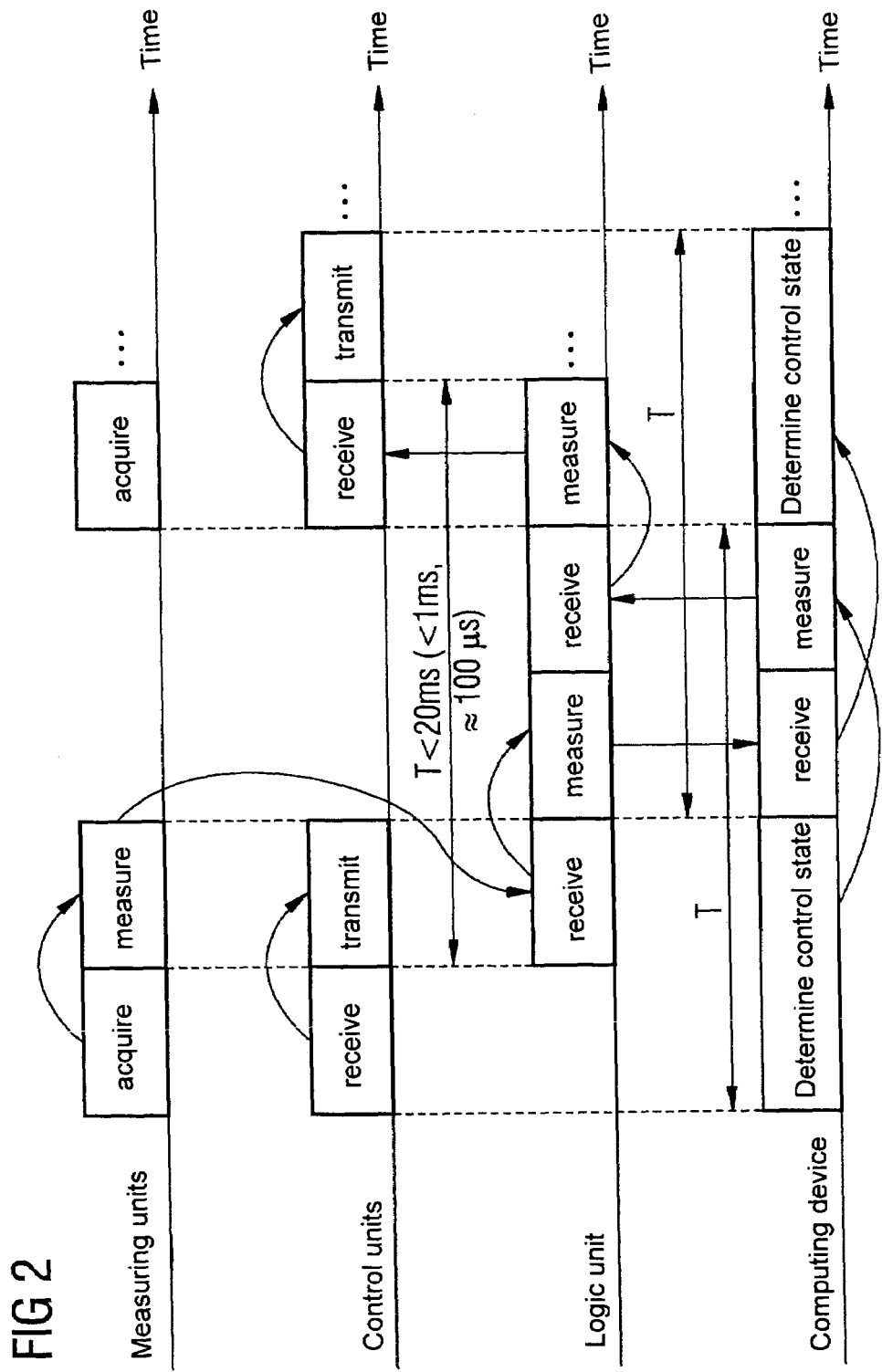
FIG. 2 is a diagram showing the operation of the various units as a function of time.

As seen in FIGS. 1 and 2, measuring units 6 measure state signals of the process 1. In fact, all state signals of the process 1 are measured by the measuring units 6. The totality of the state signals therefore represents an image of the process 1.

After the state signals are measured, they are transmitted from the measuring units 6 to the logic unit 3. The logic unit 3 is common to all measuring units 6. The logic unit 3 transmits the image of the process 1 (or at least a portion of the image) via a transmission medium 7 to a computing device 8.

Intelligent units can be located between the measuring units 6 and the logic unit 3. Moreover, the measuring units 6 themselves can also have intelligence. It should be noted, however, that the communication with the computing device 8 occurs exclusively through the logic unit 3.

After the image of the process 1 has been transmitted to the computing device 8, the logic unit 3 receives from the computing device 8 via the transmission medium 7 a control state for the process 1 (or at least a portion thereof). The control state includes control signals for all control devices 9. The logic unit 3 transmits the control signals to the control devices 9 which then affect the process 1 in response to the control signals transmitted to the control devices 9.

As seen in FIG. 2, the afore-described steps can be executed within a cycle time T which is in a millisecond range. Typically, the cycle time T is less than approximately 20 ms, preferably less than 1 ms, and can even be 100 µs or less.

According to the present invention, the computing device 8, unlike conventional devices, is neither placed directly next to nor is it identical with the logic unit 3, but can be connected to the logic unit 3 via the transmission medium 7, as shown in FIG. 1. The computing device 8 can therefore be installed at any desired location, provided that the transmission medium 7 enabled data exchange.

The transmission medium 7 can be any transmission medium known of the art, for example a computer network, e.g. in the form of a local area network (LAN). One example of a LAN is a so-called Industrial Real-Time Ethernet (IRTE). The transmission medium 7 can also be the Internet, provided that a sufficiently fast and reliable communication can be guaranteed.

Alternatively, the transmission medium can also be a point-to-point connection, for example a conventional telephone network. In a mixed installation, coupling to a computer network via a telephone dial-up connection can also be envisioned.

As shown in FIG. 1, a computer program 10 can be provided to program the computing device 8. The computer program 10 can be stored on a data carrier 11, for example a CD-ROM 11, and can be provided to the computing device 8 in this form. When programmed with the computer program 10, the computing device 8 can execute a real-time operating process, which will be described hereinafter in more detail with reference to FIGS. 1 and 2.

As shown in FIGS. 1 and 2, the computing device 8 receives from the logic unit 3 via the transmission medium 7 the image of the process 1 (or a portion thereof. Based on the image of process 1, the computing device 8 then executes a control program 12 to determine the control state for the process 1 (or a portion thereof. The control program 12 hereby interacts with the industrial technical process 1. If the process 1 is a production process 1, for example a machining process 1 of a machine tool, then the control program 12 is also a control program 12 for this type of process 1. The term "control program" hereby includes only the application program, i.e., for a machine tool program a parts program according to DIN 66025, but not an operating system. The (real-time) operating system is in this case a component of the computer program 10.

The control state determined by the computing device 8 is then transmitted by the computing device 8 to the logic unit 3 via the transmission medium 7.

The computing device 8 also executes the process steps within the cycle time T, which is identical to the cycle time T used by the logic unit 3 to execute the process steps in the logic unit 3.

The diagram of FIG. 1 emphasizes the logic concept of the transmission medium. The physical implementation of the transmission medium 7 will be described in more detail hereinafter with reference to FIG. 3, which is to be understood as representing only an exemplary embodiment.

Figure 3:
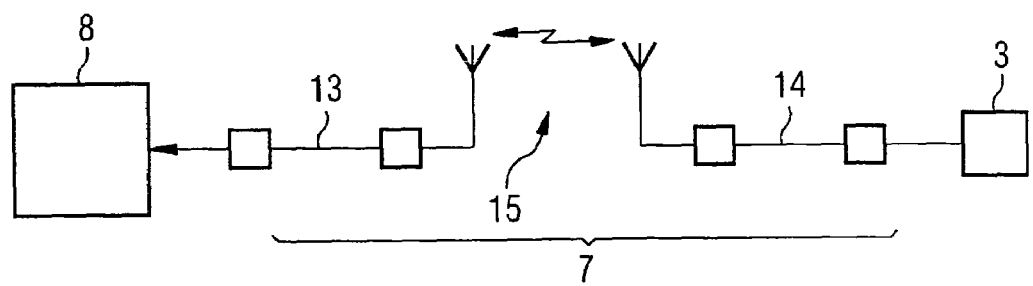
FIG. 3 is a diagram of another embodiment of a controller.

According to FIG. 3, the transmission medium 7 includes two end segments 13, 14 and a center segment 15. In the end segments 13, 14, the data are transmitted via wires, for example via copper wires or optical waveguides. In the center segment 15, the data are transmitted wireless, for example via a radio link. However, data can also be transmitted in other ways, for example, by infrared signals or ultrasound signals.

Figure 4:
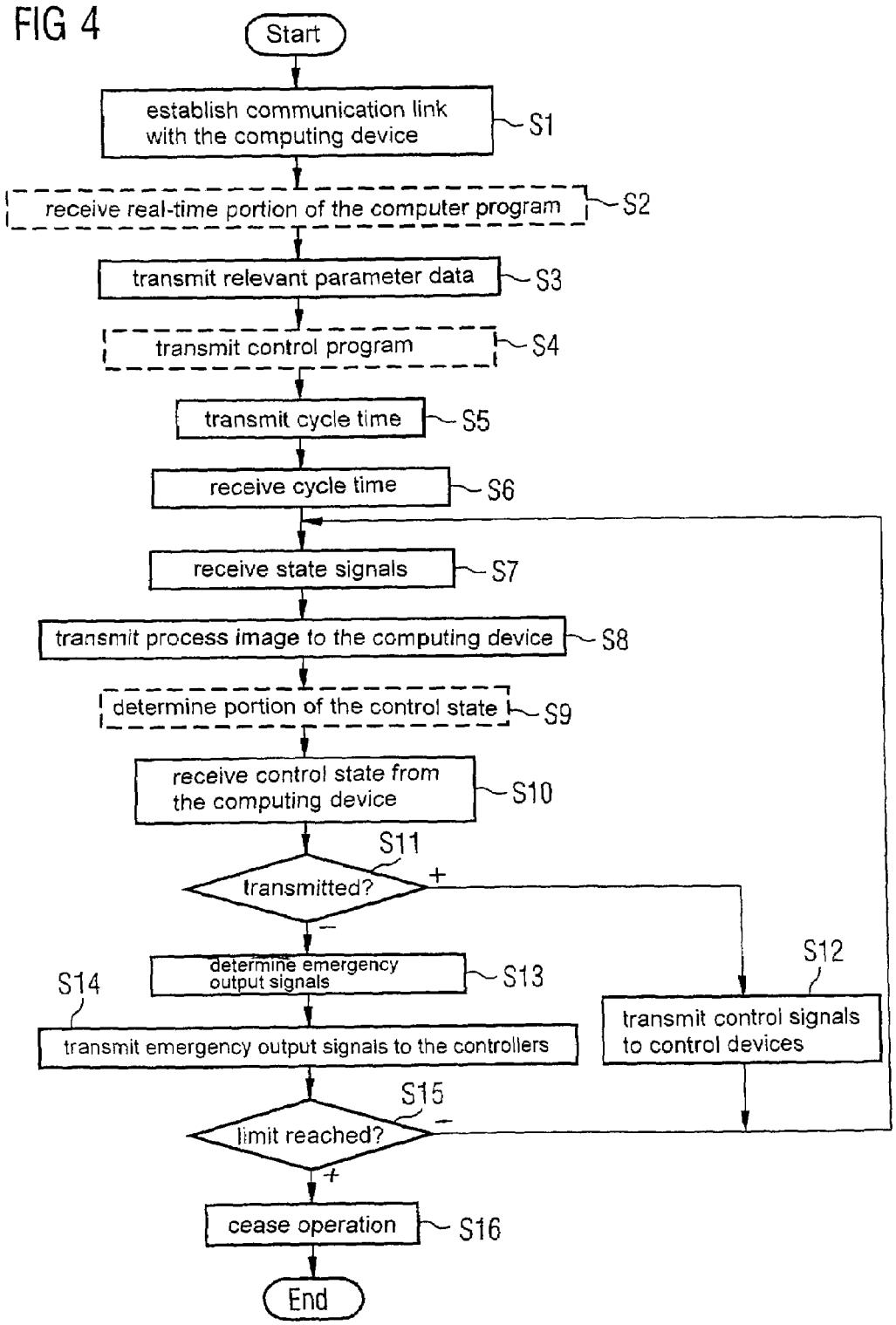
FIG. 4 shows a process flow for a computing device.

The logic unit 3 and the computing device 8 not only execute the tasks described above with reference to FIGS. 1 and 2. Additional tasks executed by the logic unit 3 and the computing device 8 will be described hereinafter in more detail with reference to FIGS. 4 and 5. FIG. 4 shows a process flow related to the logic unit 3, whereas FIG. 5 describes a process flow related to the computing device 8.

As shown in FIG. 4, the logic unit 3 establishes in a step S1 a communication link with the computing device 8.

Initially, only a basic program may be present in the controller 2 that enables only communication with a computing device 8 that is not real-time-capable. In this case, the logic unit 3 receives in a step S2 via the transmission medium 7 from the computing device 8 a real-time portion of the computer program 4 and stores the portion in the data carrier 5. The step S2 is optional and is therefore indicated in FIG. 4 by a dotted line.

In a step S3, the logic unit 3 transmits to the computing device 8 via the transmission medium 7 relevant parameter data, such as the machine design and machine configuration used to implant the process 1.

In a step S4, the logic unit 3 transmits via the transmission medium 7 the control program 12 to the computing device 8. The step S4, too, is optional and is therefore indicated in FIG. 4 by a dotted line.

In a step S5, the logic unit 3 transmits the cycle time T via the transmission medium 7 to the computing device 8. Alternatively, in a step S6, the logic unit 3 can also receive the cycle time T via the transmission medium 7 from the computing device 8. Alternatively, the cycle time T can also be preset at a fixed value. Accordingly, at most only one of the steps S5 and S6 is executed.

Following execution of steps S1 to S6, the logic unit 3 executes the steps S7 to S15. In step S7, the logic unit 3 receives the state signals measured by the measured units 6.

In step S8, the logic unit 3 transmits the image of process 1 via the transmission medium 7 to the computing device 8.

In the event that the computing device 8 only determines the portion of the control state, the logic unit 3 determines in a step S9 the remaining control state. Accordingly, the step S9 need not be present and is therefore indicated in FIG. 4 by a dotted line.

In step S10, the logic unit 3 receives the control state transmitted by the computing device 8 via the transmission medium 7.

In step S11, the logic unit 3 checks if the control state was actually transmitted by the computing device 8. If this is the case, then the logic unit 3 transmits in step S12 the control signals to the controllers 9 and thereafter returns to step S7. Otherwise, the logic unit 3 determines in step S13 emergency output signals and, in a step S14, transmits these emergency output signals to the controllers 9. The logic unit 3 can thereby control the process 1 in a defined manner, for example by operating the process 1 in an emergency mode in the absence of control signals.

After step S14, it is checked in step S15 if a maximum number of transmission attempts has been exceeded. Is this is not the case, the process returns to step S7, otherwise the process 1 ceases to operate at step S16.

The process flow depicted in FIG. 5 is executed by the computing device 8 and substantially similar to the process flow depicted in FIG. 4 for the logic unit 3.

As shown in FIG. 5, the computing device 8 initially establishes in a step S17 a communication link to the logic unit 3.

In a step S18, the computing device 8 transmits the real-time portion of the computer program 4. Step S18—like step S2 of FIG. 4—is optional and is therefore indicated in FIG. 5 by a dotted line.

In a step S19, the computing device 8 receives the relevant parameter data, for example about the design and the actual configuration of the controlled machine. In a step S20, the computing device 8 receives the control program 12. Step S20—like step S4 of FIG. 4—is optional and is therefore indicated in FIG. 5 by a dotted line.

In a step S21, the computing device 8 receives the cycle time T. Alternatively, the computing device 8 can also transmits the cycle time T to the logic unit 3, step S22. Alternatively, the cycle time T can be preset at a fixed value. Only at most one of steps S21 and S22 is therefore executed.

The computing device 8 then executes steps S23 to S26. In step S23, the computing device 8 receives from the logic unit 3 the image of the process 1. In step S24, the computing device 8 executes the control program 12 to determine the control state for the process 1 based on the image of the process 1. In step S25, the computing device 8 transmits the control state via the transmission medium 7 to the logic unit 8.

In step S26, the computing device checks if the control state was properly transmitted. For example, the logic unit 3 may be asked for an acknowledgment. If the transmission was correct, then the process returns to step S23, otherwise—for example, after several unsuccessful transmission attempts—the additional steps S23 to S26 are not executed.

The present invention has been described above in connection with a controller 2 for a machine-tool. However, the invention is not limited to machine-tools, but can also be applied to other industrial technical processes 1, in which case the controller 2 can be implemented in other ways, for example as a stored-program controller (SPS).

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A real-time control process for a controller of an industrial technical process, comprising the steps of:
   a) a plurality of measuring units measuring state signals of the process, wherein the measured state signals represent a complete image of the process;
   b) each of the measuring units transmitting the measured state signal measured by the measuring unit to a single logical device;
   c) the logical device transmitting at least a portion of the complete image of the process via a transmission medium to a computing device;
   d) the logical device receiving via the transmission medium from the computing device at least a portion of a control state for the process, wherein the control state comprises control signals for a plurality of control devices; and
   e) the logical device transmitting to each of the control devices the control signals intended for the respective control devices, wherein each of the control devices affects the process in accordance with the control signals transmitted to the corresponding controller,
   wherein the logical device checks during each cycle if the computing device has transmitted to the logical device the control state or the portion of the control state, and wherein the logical device determines emergency output signals, if the computing device has not transmitted the control state or the portion of the control state to the logical device, and transmits the emergency output signals to the plurality of control devices.

2. The real-time control process of claim 1, wherein steps a) to e) are repeatedly executed with total cycle time of less than approximately 1 ms for a single cycle.

3. The real-time control process of claim 1, wherein steps a) to e) are repeatedly executed with total cycle time of less than approximately 100 µs for a single cycle.

4. The real-time control process of claim 1, wherein the transmission medium comprises a computer network, the Internet or a local area network (LAN), or a combination thereof.

5. The real-time control process of claim 1, wherein the transmission medium comprises a point-to-point connection.

6. The real-time control process of claim 1, wherein the transmission medium comprises at least one transmission medium segment with a wireless link.

7. The real-time control process of claim 1, wherein the transmission medium comprises at least one transmission medium segment with a wired link.

8. The real-time control process of claim 1, wherein the industrial technical process comprises a production process.

9. The real-time control process of claim 8, wherein the production process comprises a machining process of a machine tool.

10. The real-time control process of claim 1, wherein before step (a), the logical device receives a real-time portion of a computer program to be executed by the logical device.

11. The real-time control process of claim 1, wherein before step (a), the logical device transmits parameter data of the process to the computing device.

12. The real-time control process of claim 1, wherein before step (a), the logical device unit transmits via the transmission medium to the computing device a control program to be executed by the computing device.

13. A real-time control process for a controller of an industrial technical process, comprising the steps of:
   a) a plurality of measuring units measuring state signals of the process, wherein the measured state signals represent a complete image of the process;
   b) each of the measuring units transmitting the measured state signal measured by the measuring unit to a single logical device;
   c) the logical device transmitting at least a portion of the complete image of the process via a transmission medium to a computing device;
   d) the logical device receiving via the transmission medium from the computing device at least a portion of a control state for the process, wherein the control state comprises control signals for a plurality of control devices; and
   e) the logical device transmitting to each of the control devices the control signals intended for the respective control devices, wherein each of the control devices affects the process in accordance with the control signals transmitted to the corresponding controller,
   wherein steps a) to b) are repeatedly executed with a total cycle time of less than approximately 20 ms for a single cycle, and wherein before step (a), the logical device transmits via the transmission medium to the computing the cycle time.

14. A real-time control process for a controller of an industrial technical process, comprising the steps of:
   a) a plurality of measuring units measuring state signals of the process, wherein the measured state signals represent a complete image of the process;
   b) each of the measuring units transmitting the measured state signal measured by the measuring unit to a single logical device;
   c) the logical device transmitting at least a portion of the complete image of the process via a transmission medium to a computing device;
   d) the logical device receiving via the transmission medium from the computing device at least a portion of a control state for the process, wherein the control state comprises control signals for a plurality of control devices; and
   e) the logical device transmitting to each of the control devices the control signals intended for the respective control devices, wherein each of the control devices affects the process in accordance with the control signals transmitted to the corresponding controller,
   wherein steps a) to e) are repeatedly executed with a total cycle time of less than approximately 20 ms for a single cycle, and
   wherein before step (a), the logical device receives from the computing device via the transmission medium the cycle time.

15. A real-time control process for a computing device comprising the steps of:

a) the computing device receiving from a single logical device via a transmission medium at least one portion of an image of an industrial technical process;
b) the computing device executing a control program and determining based on the at least one transmitted portion of the image of the process at least one portion of a control state of the process; and
c) the computing device transmitting the determined portion of the control state via the transmission medium to the logical device,
d) repeatedly executing steps a) to c) with a total cycle time of less than approximately 20 ms for a single cycle.
wherein before step (a), the computing device receives from the logical device the cycle time via the transmission medium.

16. The real-time control process of claim 15, wherein steps a) to c) are repeatedly executed with total cycle time of less than approximately 1 ms for a single cycle.

17. The real-time control process of claim 15, wherein steps a) to c) are repeatedly executed with total cycle time of less than approximately 100 µs for a single cycle.

18. The real-time control process of claim 15, wherein the transmission medium comprises a computer network, the Internet or a local area network (LAN), or a combination thereof.

19. The real-time control process of claim 15, wherein the transmission medium comprises a point-to-point connection.

20. The real-time control process of claim 15, wherein the transmission medium comprises at least one transmission medium segment with a wireless link.

21. The real-time control process of claim 15, wherein the transmission medium comprises at least one transmission medium segment with a wired link.

22. The real-time control process of claim 15, wherein the control program comprises a control program for a production process.

23. The real-time control process of claim 22, wherein the production process comprises a machining process of a machine tool.

24. The real-time control process of claim 15, wherein before step (a), the computing device transmits to the logical device a real-time portion of a computer program to be executed by the logical device.

25. The real-time control process of claim 15, wherein before step (a), the computing device receives from the logical device parameter data of the process.

26. The real-time control process of claim 15, wherein before step (a), the computing device receives from the logical device the control program via the transmission medium.

27. A real-time control process for a computing device comprising the steps of:
a) the computing device receiving from a single logical device via a transmission medium at least one portion of an image of an industrial technical process;
b) the computing device executing a control program and determining based on the at least one transmitted portion of the image of the process at least one portion of a control state of the process; and
c) the computing device transmitting the determined portion of the control state via the transmission medium to the logical device,
d) repeatedly executing steps a) to c) with a total cycle time of less than approximately 20 ms for a single cycle,
wherein before step (a), the computing device transmits to the logical device the cycle time via the transmission medium.

* * * * *

UNITED STATES PATENT AND TRADEMARK OFFICE
CERTIFICATE OF CORRECTION

| | | |
|---|---|---|
| PATENT NO. | : 7,058,460 B2 | |
| APPLICATION NO. | : 10/933130 | |
| DATED | : June 6, 2006 | |
| INVENTOR(S) | : Stefan Dolansky | |

It is certified that error appears in the above-identified patent and that said Letters Patent is hereby corrected as shown below:

Claim 13, Column 8, Line 38:

Add after "computing" --device--.

Signed and Sealed this

Eighth Day of August, 2006

JON W. DUDAS
*Director of the United States Patent and Trademark Office*